E. E. BECK.
THREAD CUTTING DIE.
APPLICATION FILED OCT. 15, 1919.
1,395,252.
Patented Nov. 1, 1921.
Fig. 1.
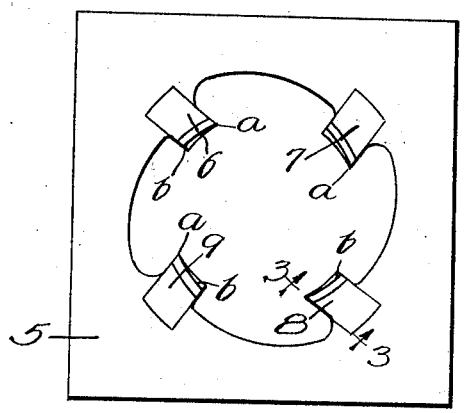
Fig. 2. Fig. 3. Fig. 4.
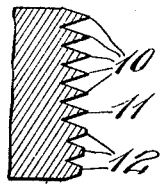 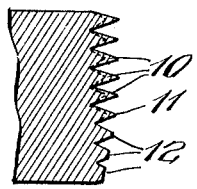 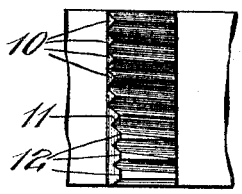
Fig. 5.
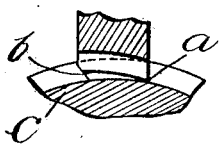
Witnesses:
W. F. Kilroy
Harry R. L. White.
Inventor:
Edward E. Beck.
By Horace King
Attys.

UNITED STATES PATENT OFFICE.

EDWARD E. BECK, OF CHICAGO, ILLINOIS, ASSIGNOR TO CROWN DIE AND TOOL COMPANY, OF CHICAGO, ILLINOIS, A CORPORATION OF ILLINOIS.

THREAD-CUTTING DIE.

1,395,252.  Specification of Letters Patent.  Patented Nov. 1, 1921.

Application filed October 15, 1919. Serial No. 330,683.

*To all whom it may concern:*

Be it known that I, EDWARD E. BECK, a citizen of the United States, residing at Chicago, Cook county, Illinois, have invented certain new and useful Improvements in Thread-Cutting Dies, of which the following, taken in connection with the drawing, is a description.

My invention has for its object the production of a thread cutting die designed to be used in cutting threads on pipes of various kinds, and is particularly desirable for use on work where great care is needed in having the pitch of the threads uniform and perfect.

Heretofore it has been found that the chasers or cutting tools will force the unsupported ends of the pipe being threaded laterally, thereby producing an imperfect cutting operation, some of the threads being cut deep and others very shallow which frequently results in having to cut new threads, all of which has made this kind of work expensive and unsatisfactory.

It is an object of my invention to provide means formed integrally with the chasers of the thread cutting die for holding and guiding the same during the cutting operation so that the pitch of the teeth on the pipe will be formed accurately and evenly and always insure a tight joint when the pipes thus threaded are assembled.

A further object of my invention is to produce a thread cutting die having means formed integrally therewith for guiding or directing the operation, which does not require any additional apparatus, attachments or device in using the same and one which is simple in construction and very effective in its operation.

In the accompanying drawings I have illustrated what I now consider the preferred form of an embodiment of my invention which will be fully explained by reference to the description and drawings accompanying this application and to the appended claims. In these drawings, Figure 1, is a plan view of a thread cutting die, Fig. 2, is an enlarged sectional view taken through one of the chasers before the teeth have been cut back or relieved, and showing part of the teeth countersunk.

Fig. 3, is a sectional view taken on line 3—3 of Fig. 1, looking in the direction of the arrows, showing the cut back teeth in dotted lines.

Fig. 4, is an enlarged perspective detail of one of the chasers, looking at the inside thereof.

Fig. 5, is an enlarged fragmentary sectional detail of one of the chasers in position when threading a pipe.

Referring to the drawings 5 is a die plate provided with the usual cutters or chasers, 6—7—8—9, extending radially into the central opening in the die. It will be observed that the outer or cutting edges $a$ of these chasers are inclined from a vertical line opposed to the direction of rotation of the pipe being threaded, shown more clearly in Fig. 1.

Part of the teeth 10 on each of the chasers have been "backed off" or relieved as shown in Figs. 3 and 4, whereby the pitch of the threads are cut on a different angle than the countersunk threads 12 of the die, and the arc of the circle formed by these threads is different from the arc formed by the other threads on the chasers, for a purpose hereinafter explained.

One tooth 11 on each chaser is a guide tooth, and has a different arc than the teeth 10. In the threading operation the countersunk teeth 12 and the guide teeth 11 start the cutting operation on the pipe being threaded. The guide tooth 11 is formed on a different arc than the other teeth and cuts a deeper groove than the advancing teeth 12 and thereby provides sufficient room for the remaining cutting teeth, 10, which follow in the threaded spiral. The tooth 11 in each chaser also forms a bearing against the pipe being threaded, thereby preventing any lateral movement of the pipe which results in uneven threads.

The teeth 12 on each chaser are countersunk as shown more clearly in Figs. 2 and 3. In the beginning of the cutting operation on the pipe being threaded, the countersunk threads first contact with the periphery of the pipe being threaded. The die progresses on the pipe until the guiding teeth 11 are reached, and they finish cutting the thread to the depth required; the remaining or following teeth 10 keeping the pitch of the thread true and accurate during the entire operation.

It will be observed that the cutting edges *a* of the teeth of each chaser are higher than the opposite edge *b* which provides a gradual clearance extending transversely of the face of each chaser of approximately $\frac{1}{32}$ of an inch, more or less, which prevents any tendency of the cutting edges of the chasers to dig into the pipe during the cutting operation.

By the use of this die no blocks or any other holding or alining mechanism is required to be used in the die stock to hold the pipe being threaded. The guiding teeth 11 and 12 are sufficient to maintain the pipe in alinement.

It will be observed that the advancing or cutting edge *a* of all the threads on each chaser are uniformly arranged, but that the face of the leading or guiding teeth are cut away toward the heel of the chaser and therefore the face of the cutting teeth of each chaser represent an arc of a circle different from the arc of the cutting teeth on each chaser clearly shown at *a* and *b* in Figs. 1 and 5.

In this cutting back or relieving the threads on the chasers, no wedging or binding of the threads on the chasers or pipe is effected during the cutting operation, the relieved portion *b* of each chaser, shown more clearly in Fig. 5, being out of contact with the pipe *c* during the threading operation.

I claim:—

1. A solid thread cutting die having an opening through its center, threaded chasers disposed radially about this opening, each of said chasers having one or more guiding teeth in front of the chasers formed integrally therewith, the face of each guiding tooth being cut away toward the heel of the chaser and representing a different arc of a circle than the cutting teeth of the chaser.

2. A solid thread cutting die having an opening through its center, threaded chasers disposed radially about said opening, each of said chasers having one or more guide teeth formed integrally therewith, said guide teeth being formed on a different arc than the other teeth of the chaser and providing a bearing against the pipe being threaded.

3. A solid thread cutting die having a central opening, radially disposed threaded chasers in said die, each having one or more guide teeth formed integrally therewith and located in front of the thread cutting teeth of each chaser, the cutting edges of said guide teeth being equal to the arc of the pipe to be cut and different from the arc of a circle of the following teeth.

4. A solid thread cutting die having a central opening, radially disposed chasers therein, the cutting edges of the threads on said chasers being arranged on arcs of a circle differing from the arc of a circle describing the opposite edge of each chaser, and guiding teeth intermediate the threads on each chaser.

5. A solid thread cutting die having a central opening, radially disposed chasers projecting into said opening, the cutting edges of the threads on each chaser being arranged on an arc of a circle corresponding to the pipe being threaded, the teeth of the threads varying transversely of the threaded face of each chaser, the advancing threads on each chaser being countersunk circumferentially thereof.

In testimony whereof I have signed this specification.

EDWARD E. BECK.